(12) United States Patent
Altmikus et al.

(10) Patent No.: US 9,174,728 B2
(45) Date of Patent: Nov. 3, 2015

(54) ELECTRICAL POWERED TAIL ROTOR OF A HELICOPTER

(71) Applicant: AIRBUS HELICOPTERS DEUTSCHLAND GMBH, Donauworth (DE)

(72) Inventors: Andree Altmikus, Aurich (DE); Manuel Kessler, Kirchheim A.N. (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 323 days.

(21) Appl. No.: 13/719,839

(22) Filed: Dec. 19, 2012

(65) Prior Publication Data

US 2013/0170985 A1 Jul. 4, 2013

(30) Foreign Application Priority Data

Dec. 28, 2011 (EP) .................................. 11400062

(51) Int. Cl.
*B64C 27/06* (2006.01)
*B64C 27/12* (2006.01)
*B64C 27/82* (2006.01)
*B64C 27/72* (2006.01)
*B64C 27/78* (2006.01)
(Continued)

(52) U.S. Cl.
CPC .................. *B64C 27/12* (2013.01); *B64C 27/82* (2013.01); *H02K 7/116* (2013.01); *H02K 7/14* (2013.01); *H02K 16/00* (2013.01); *B64C 2027/8209* (2013.01); *B64C 2027/8254* (2013.01)

(58) Field of Classification Search
CPC B64C 2027/8254; B64C 27/12; B64C 27/10; B64C 27/22; B64C 2201/108; B64C 27/06; B64C 27/78; B64C 11/001; B64C 2230/28; B64C 23/02; B64C 27/022; B64C 27/32; B64C 27/68; B64C 27/72
USPC .......... 244/17.19, 17.21, 21; 416/3, 147, 155, 416/160, 162
See application file for complete search history.

(56) References Cited

U.S. PATENT DOCUMENTS 3,506,219 A * 4/1970 Mouille et al. ............. 244/17.21
4,953,811 A 9/1990 Smith
(Continued)

FOREIGN PATENT DOCUMENTS

DE 102007013732 A1 10/2008
WO 0184063 A2 11/2001
(Continued)

OTHER PUBLICATIONS

Search Report and Written Opinion; Application No. EP 11400062; dated May 14, 2012.

*Primary Examiner* — Christopher P Ellis
*Assistant Examiner* — George Andonyan
(74) *Attorney, Agent, or Firm* — Brooks Kushman P.C.

(57) ABSTRACT

The invention is related to an electrical powered tail rotor (1) of a helicopter comprising a housing (2) around the tail rotor (1), and at least one permanent magnet energized synchronous motor with a stator (6, 7) with an increased number of poles (9). Said at least one synchronous motor is integrated as a torus (8) around an opening of the housing (2) encompassing the tail rotor (1). Blades (4) of the tail rotor (1) are fixed to at least one rotating component (10, 11) of said at least one synchronous motor. Supply means provide for electric energy to said at least one synchronous motor. Blade pitch control means are provided at the torus (8).

15 Claims, 3 Drawing Sheets

(51) Int. Cl.
*B64C 27/20* (2006.01)
*H02K 7/116* (2006.01)
*H02K 7/14* (2006.01)
*H02K 16/00* (2006.01)

(56) References Cited

U.S. PATENT DOCUMENTS

| | | | | |
|---|---|---|---|---|
| 5,351,913 | A | * | 10/1994 | Cycon et al. .................... 244/60 |
| 6,575,401 | B1 | * | 6/2003 | Carver ......................... 244/12.2 |
| 6,600,249 | B2 | | 7/2003 | Nelson |
| 2004/0051401 | A1 | | 3/2004 | Hansen |
| 2005/0082421 | A1 | * | 4/2005 | Perlo et al. ................... 244/12.2 |
| 2006/0049304 | A1 | | 3/2006 | Sanders |
| 2007/0034738 | A1 | * | 2/2007 | Sanders et al. .............. 244/23 A |
| 2009/0140095 | A1 | | 6/2009 | Sirohi |
| 2010/0025526 | A1 | * | 2/2010 | Lawrence ................... 244/17.23 |
| 2011/0031760 | A1 | | 2/2011 | Lugg |
| 2011/0147511 | A1 | * | 6/2011 | Poltorak ..................... 244/17.19 |
| 2012/0037750 | A1 | * | 2/2012 | Dvoeglazov ................. 244/17.17 |
| 2013/0243598 | A1 | * | 9/2013 | Ziegler et al. ................. 416/147 |

FOREIGN PATENT DOCUMENTS

| WO | 2005100154 A1 | 10/2005 |
|---|---|---|
| WO | 2009129309 A2 | 10/2009 |

* cited by examiner

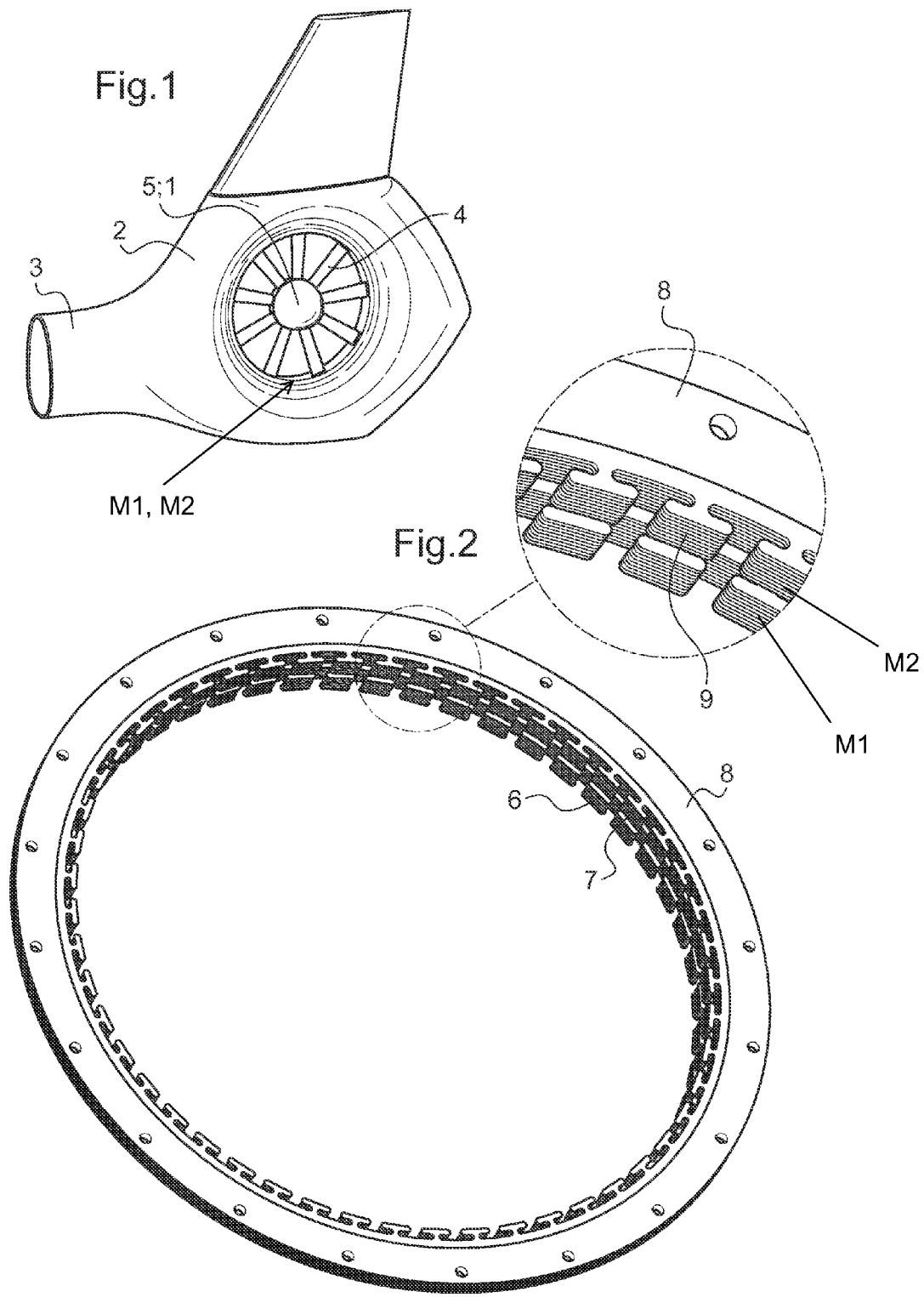

ELECTRICAL POWERED TAIL ROTOR OF A HELICOPTER

CROSS REFERENCE TO RELATED APPLICATIONS

This application claims priority to European patent application No. 11 400062.3 filed Dec. 28, 2011, the disclosure of which is incorporated in its entirety by reference herein.

BACKGROUND OF THE INVENTION (1) Field of the Invention

The invention is related to an electrical powered tail rotor of a helicopter with the features of the preamble of claim 1.

(2) Description of Related Art

The power consumed by a tail rotor of state of the art helicopters is supplied from a central energy generator via a main gear box, a plurality of intermediate gears and a tail rotor shaft. By removing the main gear box and the rigid mechanical coupling between energy generator and tail rotor more design flexibility for the helicopter may be attained. One of the keys to realise an electrical powered tail rotor of a helicopter is a suitable electrical motor.

The document US 2004051401 A1 discloses an electric motor for rotating an object around a central axis. The electric motor includes a motor casing. A circular segmented rail element is disposed within the motor casing about the central axis. The circular segmented rail element includes metallic non-ferrous segments interleaved with non-metallic segments. Each of the metallic non-ferrous segments has a predetermined segment length. At least one coil element is connected to the motor casing. The circular segmented rail element is disposed adjacent the at least one coil element. The at least one coil element has a predetermined coil length that is less than or equal to the predetermined segment length. The at least one-coil element is configured to apply electromagnetic energy to the circular segmented rail element, such that the circular segmented rail element rotates around the central axis.

The document WO 0184063 A2 discloses a stator assembly for a brushless DC ring motor for a cooling fan piloted on the stator assembly. A ring supports a plurality of fan blades for sweeping an area inside the shroud. A rotor assembly for the brushless DC ring motor is attached to the ring of the cooling fan. The rotor assembly confronts the stator assembly around an outer diameter of the stator assembly. The cooling system is controlled by an electronic controller to rotate the cooling fan to provide appropriate cooling for the vehicle.

A hybrid helicopter drive has been proposed in the document "The Hybrid Helicopter Drive, . . . " by Peter Jänker et al. at Europ. Rotorcraft Forum, September 2010" with an integration of an electrical motor for a Fenestron tail rotor. The electrical motor is realised by so called disc shaped electrical "Trans-Flux-Motors" with increased pole numbers. The electrical "Trans-Flux-Motor" for the Fenestron tail rotor is conceived as a torus around the Fenestron opening, the blade tips of the tail rotor being fixed to its rotating component. An electrical "Trans-Flux-Motor" is presented in document DE 10 2007 013 732 A1.

The document DE 102007013732 A1 discloses a direct drive with a stator and one or multiple support rings 3 that are made of plastic. The support rings supports the permanent magnets that are arranged in two or more concentric rings. The annular or sector shaped stator logs, made of plastic, are arranged in axial direction adjacent to the concentric rings of the support rings in such a way that a magnetic flux is allowed in radial direction between adjacent concentric rings.

The document "The Hybrid Helicopter Drive, . . . " by Peter Jänker et al. at Europ. Rotorcraft Forum, September 2010" further discloses such electrical "Trans-Flux-Motors" with two disks for the main rotor.

The document WO 2005/100154 A1 discloses a rotor for mounting on a helicopter drive shaft, comprising a hub for location on the shaft and a plurality of blades mounted to and extending out from the hub, wherein a pitch angle ([phi]) of at least one of the blades is controllable with respect to each other blade by an electrical stepper motor mechanism arranged at the hub. Also disclosed is a method for determining a pitch angle ([phi]) of the blades of the rotor, a computer program arranged to, when loaded onto a computing system, utilise an algorithm for determining blade pitch angle ([phi]) values for the blades, an alternator for providing power to motors that control the pitch of the blades and a control method for implementation by a computer in controlling the pitch of the blades in real time.

The document US 2009/140095 A1 discloses a rotary-wing aircraft with an electric motor mounted along an axis of rotation to drive a rotor system about the axis of rotation.

The document U.S. Pat. No. 4,953,811 A discloses a helicopter engine turning a tail rotor while it is turning the main rotor. Tail rotors, while essential components, take power from the engine, introduce a drag force, add weight, and increase rotor noise. Since the engine is as close as possible to the main rotor, the complexity, number of parts, weight and efficiency of the remote tail rotor have gone unchanged. Those parts and hence their added weights have been eliminated. A self-driving tail rotor for a helicopter is provided.

The document WO 2009/129309 A2 discloses a wind generator in which superconducting ring generators are utilized without the need for a load bearing drive shaft and other mechanical components allowing for the use of variable geometry blades, a decrease in the overall weight, and an increase in the overall efficiency of the wind generator system.

The document US 2006/049304 A1 discloses a hover aircraft with an air impeller engine having an air channel duct and a rotor with outer ends of its blades fixed to an annular impeller disk that is driven by magnetic induction elements arrayed in the air channel duct. The air-impeller engine is arranged vertically in the aircraft frame to provide vertical thrust for vertical takeoff and landing. Preferably, the air-impeller engine employs dual, coaxial, contra-rotating rotors for increased thrust and gyroscopic stability. An air vane assembly directs a portion of the air thrust output at a desired angle to provide a horizontal thrust component for flight maneuvering or translation movement. The aircraft can employ a single engine in an annular fuselage, two engines on a longitudinal fuselage chassis, three engines in a triangular arrangement for forward flight stability, or other multiple engine arrangements in a symmetric, balanced configuration. Other flight control mechanisms may be employed, including side winglets, an overhead wing, and/or air rudders or flaps. An integrated flight control system can be used to operate the various flight control mechanisms. Electric power is supplied to the magnetic induction drives by high-capacity lightweight batteries or fuel cells. The hover aircraft is especially well suited for applications requiring VTOL deployment, hover operation for quiet surveillance, maneuvering in close air spaces, and long duration flights for continuous surveillance of ground targets and important facilities requiring constant monitoring.

BRIEF SUMMARY OF THE INVENTION

It is an object of the invention to provide for an electrical powered tail rotor of a helicopter with improved efficiency.

A solution is provided with an electrical powered tail rotor of a helicopter with the features of claim 1.

According to the invention an electrical powered tail rotor of a helicopter (H) comprises a housing around the tail rotor and at least one permanent magnet energized synchronous motor with an increased pole number. Said at least one synchronous motor is integrated as a torus in the housing around an opening of the housing encompassing the tail rotor. Blades of the tail rotor are fixed to at least one rotating component of said at least one synchronous motor. Supply means provide electric energy to said at least one synchronous motor. The invention is characterized in that blade pitch control means are provided at the torus. As a major advantage the inventive electrical powered tail rotor of the helicopter allows replacement of the tail drive shaft by essentially less weighing cable to the tail rotor. Drive and control of the inventive electrical powered tail rotor can be integrated and deletion of a stator at the tail rotor results in considerable less noise.

A further advantage the inventive electrical powered tail rotor of the helicopter is separation of the propulsion of main rotor and tail rotor and thus independence between main rotor and tail rotor in terms of rotational speed allowing higher forward speeds for the helicopter as the main rotor speed can be adapted over a wide range to the optimum required. According to a still further advantage of the inventive electrical powered tail rotor of the helicopter noise emitted by the rotors can be reduced through setting of the respective rotor speeds such, that the noise interaction between main and tail rotor is minimizing the total emission. A gearbox for the tail rotor is not needed any longer with the subsequent advantage of a high potential for less weight. There is as well high potential to ease the process of adjustment for the tail rotor unit and drastically reduce production cost as the installation of the drive-shaft, as well as its production, requires considerable efforts. The inventive electrical powered tail rotor of the helicopter allows independent control of the tail rotor thrust by means of rotational speed, blade pitch and tail rotor torque, thus making power available independent from the main rotor system for a wide range of power settings, airspeeds, altitudes and temperature. As an example the rotor speed can be used to compensate for altitude effects more efficiently than can be done by tail rotor blade pitch.

According to the invention it would even be possible to completely stop the tail-rotor during forward flight and thus reduce the drag and the power demand of the helicopter as the tail-rotor is not requiring power. The use of an electrical motor for the drive of the tail rotor of the helicopter allows more possibilities to shape the core of the ducted tail rotor, and to have more possibilities to optimize the aerodynamic shape of the complete tail unit, especially the tail boom. The permanent magnet energized synchronous motor has excellent control characteristics and excellent efficiency for the transformation of electrical power into mechanical power. The electrical motors of the invention have low weight at high power output with balanced efficiency over a wide range of speed and power settings and are not less reliable than traditional mechanical drive trains and engines.

According to a preferred embodiment of the invention an electrical powered tail rotor of a helicopter comprises two coaxial synchronous motors with two coaxial rotating components and the blades of the tail rotor are linked to each of said respective coaxial rotating components of the two synchronous motors. The two synchronous motors operate at essentially the same rotational speed allowing a relative twist between the two coaxial rotating components for control of the blade pitch of the blades of the tail rotor by means of a suitable mechanism. The phase shift between the two coaxial rotating components results in a collective change of the blade pitch for all blades and thus allows control of the thrust of the tail rotor. The two synchronous motors of the invention each have a big diameter and each have little axial length. The two synchronous motors for the tail rotor are arranged in a fail-safe concept, i.e. the failure of one will leave at least half of the power available. The excellent control characteristics of the permanent magnet energized synchronous motor provide for the precise control of the blade pitch of the blades of the tail rotor.

According to a further preferred embodiment of the invention each stator is provided on an inner circumference with a plurality of poles and each of said two coaxial rotating components with a corresponding plurality of permanent magnets on an outer circumference of each of the rotating components. The poles and permanent magnets are each preferably arranged regularly in pairs, with the permanent magnets in pairs out of phase to provide for continuous interference of at least a part of the permanent magnets.

According to a further preferred embodiment of the invention the two coaxial rotating components are supported by a magnetic bearing integrated in the torus around the housing opening encompassing the tail rotor. The magnetic bearing allows contact free rotation of the mobile parts of the tail rotor.

According to a further preferred embodiment of the invention a retainer is provided at the torus around the housing opening encompassing the tail rotor to withhold said one or two coaxial rotating components at start or in case of a failure of the magnetic bearing.

According to a further preferred embodiment of the invention said two coaxial rotating components are supported by a ball bearing between a stator and the rotating components of each of said two synchronous motors.

According to a further preferred embodiment of the invention said two coaxial rotating components are linked by a bevel gear to the blades of the tail rotor.

According to a further preferred embodiment of the invention said two synchronous motors are asymmetric. One of said two synchronous motors may be conceived to provide all the driving power for the blades of the tail rotor whereas the other of said two synchronous motors solely controls the blade pitch. Blades of this inventive embodiment are preferable connected without azimuthal tolerance to the synchronous motors conceived to provide the driving power. The phase shift of said two synchronous motors relative to each other solely controls the blade pitch of this further preferred embodiment of the invention.

According to a further preferred embodiment of the invention a sliding sleeve is provided at the torus for control of the pitch of the blades of said one coaxial rotating component of said one synchronous motor.

BRIEF SUMMARY OF THE SEVERAL VIEWS OF THE DRAWINGS

Preferred embodiments of the invention are presented by means of the following description with reference to the attached drawings, from which:

FIG. 1 shows a spatial view of a tail rotor of a helicopter according to the invention, FIG. 2 shows a spatial view of stators of electrical motors around a tail rotor according to the invention.

DETAILED DESCRIPTION OF THE INVENTION

Figure 3:
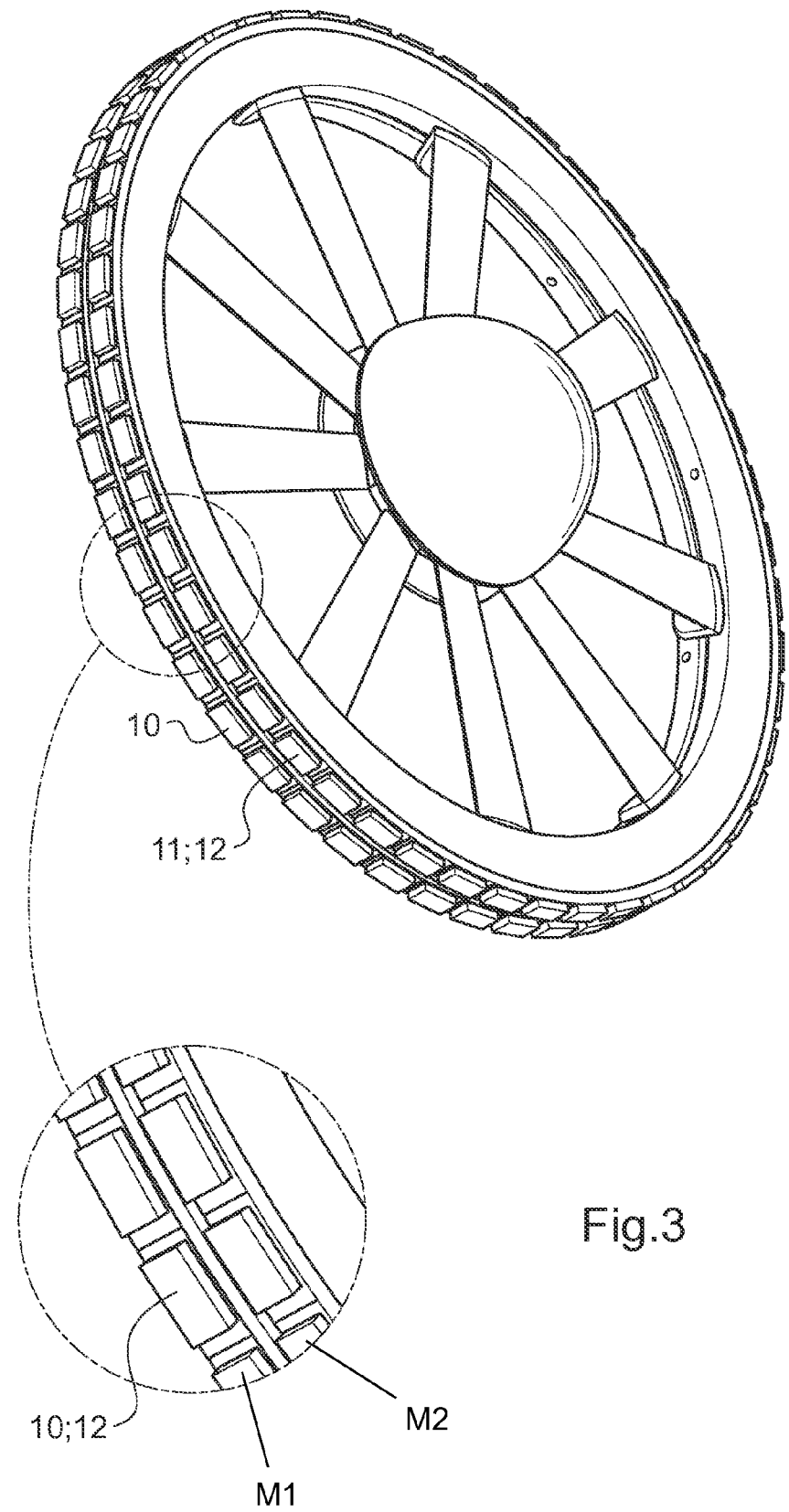
FIG. 3 shows a spatial view of two coaxial rotating components of electrical motors of a tail rotor according to the invention.

According to FIG. 1 a tail rotor 1 is arranged within a housing 2 of a helicopter's tail boom 3. Blades 4 of the tail rotor 1 are centrally supported by a hub 5. Hub 5 is essentially ball shaped towards an inlet side and essentially flat towards an outlet side of the tail rotor 1.

According to FIG. 2 two coaxial stators 6, 7 are provided on the inner circumference of a torus 8 of a brushless electrical motor assembly composed of two permanent magnet energized synchronous motors M1, M2 with a plurality of poles 9 on each of the two coaxial stators 6, 7.

The poles 9 on each of the two coaxial stators 6, 7 are connected to supply means (not shown) for electrical power. Power semiconductors (not shown) and microcontrollers (not shown) provide for two multiphase inverters (not shown) for precise control of the two brushless synchronous motors M1, M2.

According to FIG. 3 the electrical motor assembly is composed of one rotating component 10, 11 for each of said two synchronous motors M1, M2. The two rotating components 10, 11 are coaxial. A plurality of permanent magnets 12 arranged regularly on an outer circumference of each of the rotating components 10, 11 correspond to the plurality of poles 9 on each of the two coaxial stators 6, 7.

Blade tips of the blades 4 of the tail rotor 1 are held in between the two rotating components 10, 11.

The blade pitch control means includes the provision of phase shift between the two rotating components 10, 11 of the synchronous motors M1, M2 by rotating the two rotating components 10, 11 coaxially relative to each other. The control of the respective angular positions of the two rotating components 10, 11 relative to each other may be effected with special sensors, e. g. on the basis of Hall effect due to the passing permanent magnets 12 or without sensors by detecting any voltages induced in momentarily current free coils.

Figure 4:
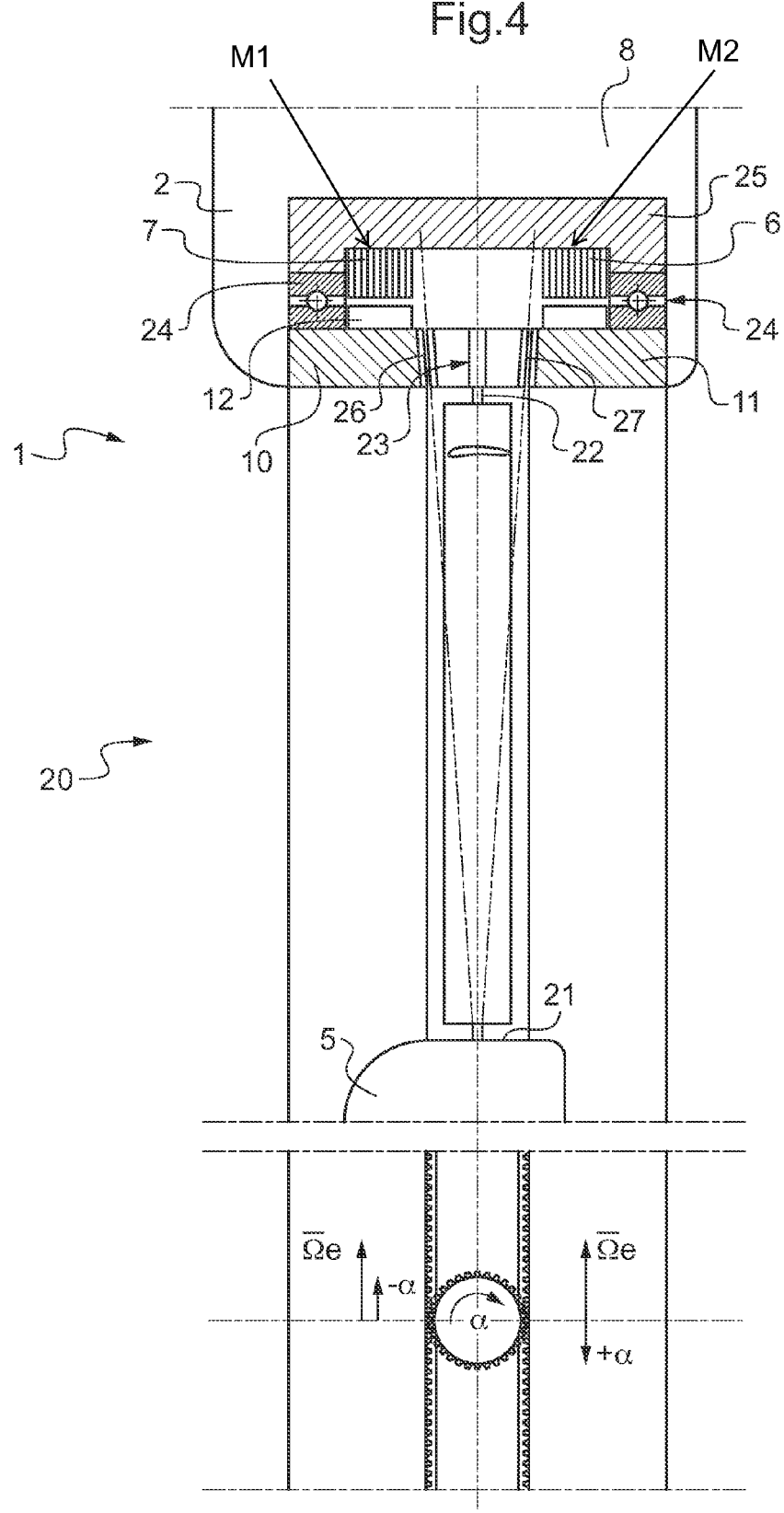
FIG. 4 shows a cross sectional view of the electrical motor according to the invention.

According to FIG. 4 corresponding features are referred to with the references of FIG. 1-3. The anti-torque system, i.e. the profiled blades 4 of the tail rotor 1 of a housed concept like the "Fenestron" is powered electrically by the two coaxial synchronous motors fitted into the housing 2 of the tail rotor 1.

The tail rotor 1 comprises an inlet fairing 20 for the blades 4 supported in a pivoting mechanism 21 of the hub 5 of said ducted fan. The blades 4 of the tail rotor 1 are held at their respective blade tips 22 in a bevel gear 23. The bevel gear 23 is mounted between the two rotating components 10, 11 of the two coaxial synchronous motors M1, M2 as a link for the blades 4 to each of the two rotating components 10, 11. The blades 4 are rotated via the blade tips 22 with the bevel gear 23. The bevel gear 23 engages with gears 26, 27 preferably all along inner lateral faces of the rotating components 10, 11. The gears are provided with small moduli to allow tolerances for the blade pitch.

The two coaxial synchronous motors M1, M2 comprise the permanent magnets 12 arranged in pairs regularly on the outer circumference of each of the rotating components 10, 11 as passive flux rings. The rotating components 10, 11 are respectively supported by outer thin annular roller bearings 24 or by magnetic bearings (not shown) as retainer. The roller bearings 24 support the two rotating components 10, 11 against a frame type casing 25 of the torus 8. Layered sheet metal packages for the respective poles 12 of the coaxial stators 6, 7 are mounted against the frame type casing 25 on the inner circumference of the torus 8. The layered sheet metal packages for the respective poles 12 abut laterally against the inside of the thin annular roller bearings 24 and the inside of flanks of the frame type casing 25.

A relative rotation of the two rotating components 10, 11 with regard to each other rotates the bevel gear 23 of the blade pitch control means. The rotation of the bevel gear 23 is transmitted to the blade tip 22 of the profiled blade 4 for control of the blade pitch and thus the thrust of the operating tail rotor 1. The blades 4 of the tail rotor 1 may be irregularly distributed along the circumference of the two rotating components 10, 11 for less sound emission of the tail rotor 1.

The two coaxial synchronous motors M1, M2 may be asymmetric with regard to drive power, i.e. one of the two coaxial synchronous motors may take over all of the drive power while the other is the blade pitch control means exclusively taking care of the control of the blade pitch of the blades 4. The blades 4 would be linked to the coaxial synchronous motor taking over all of the drive power in such a way that there would be no azimuthal move any more.

The provision of phase shift between the two rotating components 10, 11 of the two coaxial synchronous motors M1, M2 allows a further control of the thrust provided by the tail rotor 1, namely supplemental to the control of the thrust by varying solely the rotational speed of the tail rotor 1.

In case of stationary flight the two coaxial synchronous motors M1, M2 have exactly the same rotational speed and essentially the same power rate. The profiles of the blades 4 may be selected with a so called S-lay-out for a positive zero moment coefficient or this moment may be used as retroactive moment by a selection of the pivot axis of the blades 4 with a few percents before a quarter of the blade chord. Any of said selections would allow a safe landing in case of a failure of the control due to a neutral positioning of the blades 4.

For a tail rotor 1 with only one synchronous motor a sliding sleeve as the blade pitch control means may be provided at the torus 8 for control of the pitch from the outer radius of the blades 4 and thus for supplemental control of the thrust of said tail rotor 1 with one coaxial rotating component 10.

What is claimed is:

1. An electrical powered tail rotor assembly of a helicopter comprising:
   a tail rotor having multiple blades;
   a housing around the tail rotor;
   two coaxial permanent magnet synchronous motors that are each provided with a stator and a rotatable component that is coaxial with respect to the stator, each stator including multiple poles, the synchronous motors being integrated as a torus around an opening of the housing encompassing the tail rotor;
   supply means for supplying electric energy to the synchronous motors; and
   blade pitch control means provided at the torus, the blade pitch control means including a gear that is mounted between the rotatable components of the synchronous motors and that links the blades of the tail rotor to each of the rotatable components.

2. The tail rotor according to claim 1 wherein the poles of each stator are provided on an inner circumference of the stator, and each rotatable component is provided with a corresponding plurality of permanent magnets on an outer circumference of the rotatable component, the poles being arranged regularly in pairs on the inner circumferences of the stators, and the permanent magnets being arranged regularly in pairs on the outer circumferences of the rotatable components.

3. The tail rotor according to claim 1 wherein the gear comprises a bevel gear.

4. The tail rotor according to claim 1 wherein the two synchronous motors are configured to be asymmetric to each other with respect to drive power.

5. The tail rotor according to claim 1, wherein a sliding sleeve is provided at the torus for control of the pitch of the blades of one coaxial rotating component of one synchronous motor.

6. The tail rotor according to claim 2, wherein a retainer is provided at the torus around the housing opening encompassing the tail rotor.

7. The tail rotor according to claim 6, wherein the two coaxial rotatable components are supported by a magnetic bearing integrated in the torus around the housing opening encompassing the tail rotor.

8. The tail rotor according to claim 6, further comprising a ball bearing between the stator and the rotatable component of each of the two synchronous motors for supporting the rotatable components.

9. An electric powered tail rotor assembly for a helicopter, the tail rotor assembly comprising:
   a tail rotor having multiple blades;
   an electric motor assembly including two coaxial synchronous motors, each synchronous motor having a stator and a rotatable component that is coaxial with respect to the stator, each stator being provided with a plurality of poles; and
   blade pitch control means associated with the electric motor assembly for altering pitch of the blades of the tail rotor, the blade pitch control means including a gear that is mounted between the rotatable components of the synchronous motors and that links the blades of the tail rotor to each of the rotatable components.

10. The tail rotor assembly according to claim 9 wherein the tail rotor includes a hub that supports the blades.

11. The tail rotor assembly according to claim 9 wherein the gear comprises a bevel gear.

12. The tail rotor assembly according to claim 9 wherein the two synchronous motors are configured to be asymmetric to each other with respect to drive power.

13. The tail rotor assembly according to claim 10 wherein, for each stator, the poles are provided at an inner circumference of the stator, and each of the rotatable components is provided with a corresponding plurality of permanent magnets at an outer circumference of the rotatable component.

14. The tail rotor assembly according to claim 13 wherein the two rotatable components are supported by a magnetic bearing.

15. The tail rotor assembly according to claim 13 wherein each synchronous motor comprises a ball bearing between the stator and the rotatable component.

* * * * *